United States Patent [19]

Rueckheim et al.

[11] Patent Number: 4,780,164
[45] Date of Patent: Oct. 25, 1988

[54] METHOD FOR PRODUCING GAS-CONTAINING INSULATING GLASS ASSEMBLIES

[75] Inventors: Eric W. Rueckheim, Muscoda, Wis.; Roger O'Shaughnessy, Chaska, Minn.

[73] Assignee: Cardinal IG Company, Minneapolis, Minn.

[21] Appl. No.: 932,517

[22] Filed: Nov. 20, 1986

[51] Int. Cl.$^4$ .................. B32B 31/00; B65H 29/20
[52] U.S. Cl. .................. 156/104; 156/109; 156/145; 156/286; 156/292; 156/382; 156/497
[58] Field of Search ............. 156/109, 107, 105, 104, 156/145, 87, 286, 292, 99, 382, 497

[56] References Cited

U.S. PATENT DOCUMENTS

| | | | |
|---|---|---|---|
| 2,213,395 | 9/1940 | Hopfield | 156/109 |
| 2,565,937 | 8/1951 | Verhagen | 20/56.5 |
| 2,667,951 | 2/1954 | Gall | 189/78 |
| 2,756,467 | 7/1956 | Etling | 20/56.5 |
| 2,918,708 | 12/1959 | Sharp et al. | 20/35 |
| 2,966,435 | 12/1960 | Kassinger | 264/157 |
| 3,128,509 | 4/1964 | Stotz | 20/11 |
| 3,212,179 | 10/1965 | Koblensky | 29/451 |
| 3,683,974 | 8/1972 | Stewart et al. | 141/4 |
| 3,781,003 | 12/1973 | De Angelis | 156/105 |
| 3,932,971 | 1/1976 | Day | 52/171 |
| 4,157,140 | 6/1979 | Glasgow | 156/99 |
| 4,268,553 | 5/1981 | Marzouki | 156/109 |
| 4,369,084 | 1/1983 | Lisec | 156/382 |
| 4,393,105 | 7/1983 | Kreisman | 428/34 |
| 4,495,023 | 1/1985 | Lisec | 156/109 |
| 4,708,762 | 11/1987 | Lenhardt | 156/109 X |

FOREIGN PATENT DOCUMENTS

| | | |
|---|---|---|
| 056762 | 7/1982 | European Pat. Off. . |
| 3402323 | 8/1985 | Fed. Rep. of Germany . |
| 2344700 | 10/1977 | France . |
| 2442948 | 6/1980 | France . |

*Primary Examiner*—Robert A. Dawson
*Assistant Examiner*—J. Davis
*Attorney, Agent, or Firm*—James R. Haller

[57] ABSTRACT

The inventon relates to a method of producing a plurality of multi-pane insulating glass assemblies in which the assemblies are formed into a self-supporting unit for further fabrication. Each assembly is provided with at least one exteriorly accessible opening, and the assemblies, supporting one another in surface-to-surface contact, are moved along a conveyor as a unit into a vacuum chamber. Vacuum is drawn on the unit to evacuate each interpane space, following which a gas having coefficient of thermal conductivity lower than that of air is introduced into the chamber to fill the interpane spaces of the glass assemblies. The assemblies as a unit are then conveyed out of the vacuum chamber and the exteriorly accessible openings are sealed. During the evacuation and refilling steps, the glass assemblies are maintained in a generally vertical orientation, and each glass assembly is supported by a neighboring assembly against undue bowing of the glass panes due to pressure differentials between the interior of the vacuum chamber and the interpane spaces.

15 Claims, 4 Drawing Sheets

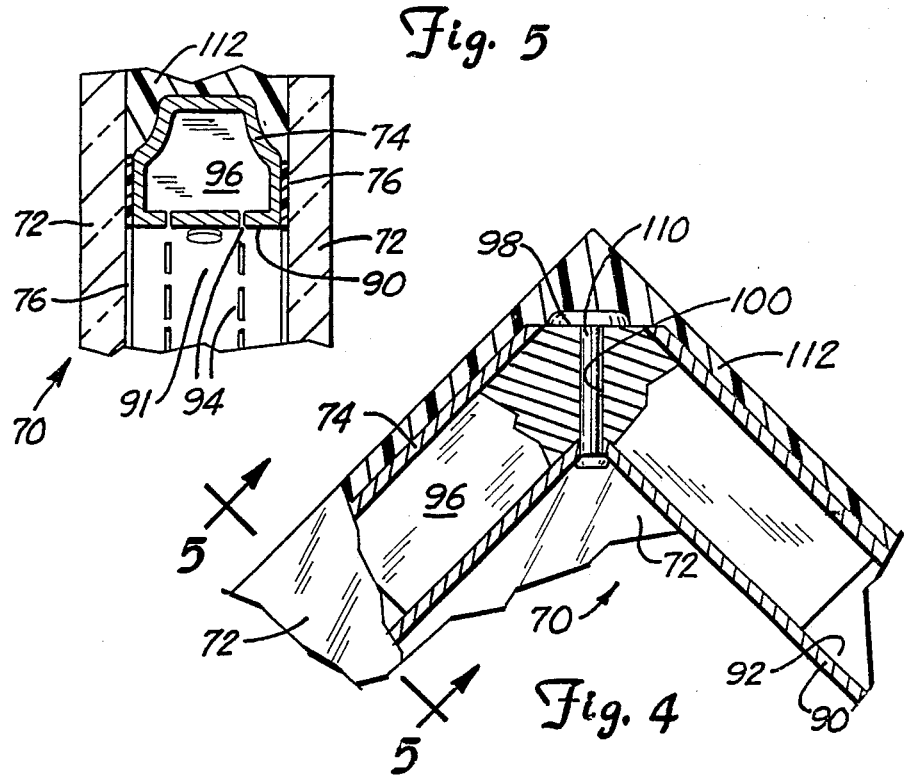
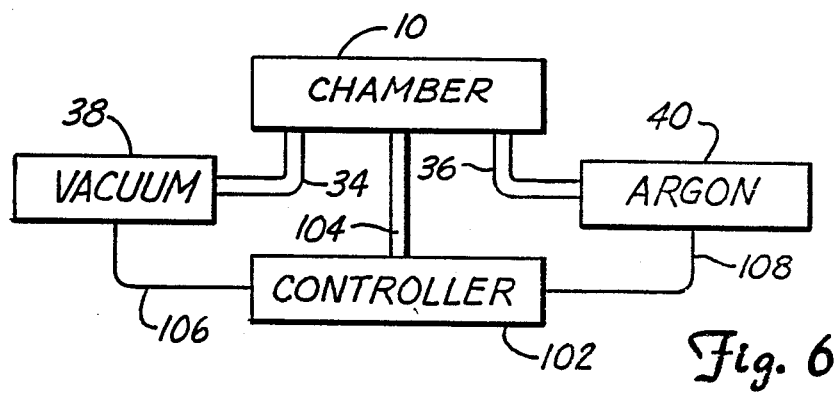

METHOD FOR PRODUCING GAS-CONTAINING INSULATING GLASS ASSEMBLIES

FIELD OF THE INVENTION

The present invention provides quick and commercially economical methods and apparatus for producing multi-pane insulating glass assemblies having interpane spaces filled with a gas having a coefficient of thermal conductivity lower than that of air.

BACKGROUND OF THE INVENTION

Various methods and devices have been proposed for filling the space between panes of insulating glass assemblies with dry or generally inert gases for the purpose of avoiding internal corrosion, condensation and the like, often associated with moist air. U.S. Pat. No. 4,369,084, for example, describes filling of the interpane space of an insulating glass assembly with sulfur hexafluoride, whereas U.S. Pat. No. 3,683,974 employs a fluorocarbon gas for the same purpose. Nitrogen is the gas of choice for this purpose in U.S. Pat. No. 2,756,467, and U.S. Pat. No. 4,393,105 discloses the use of a low heat transfer gas such as argon.

Prior art methods for replacing air with another gas in an insulating glass assembly are cumbersome and time consuming. In the above-mentioned U.S. Pat. No. 2,756,467, rubbery peripheral spacers are employed between pairs of glass panes, and hypodermic needles are forced through the spacers to withdraw air from the interpane spaces and to deliver nitrogen to the spaces. In U.S. Pat. No. 4,369,084, $SF_6$, a heavy gas, is caused to enter the space between panes at the bottom of a glass assembly and to gradually fill the assembly from its bottom, thus displacing air. In U.S. Pat. No. 3,683,974, sealed, multi-pane glass assemblies are provided with holes through the glass panes through which a fluorocarbon gas is injected, air again being displaced from the interiors of the assemblies. In U.S. Pat. No. 4,393,105, a vacuum can either be drawn on individual multi-pane glass assemblies or the units can be assembled in an environment of vacuum or low heat-loss gas.

Modern insulating glass assemblies may employ extruded metal spacers that may be generally rectangular in cross section and that have hollow interiors. The spacers are bonded to confronting glass pane surfaces by means of adherent strips of a polymeric material such as polyisobutylene, and the spacers often have a plurality of small slots or holes in their walls that face the interpane spaces. Desiccants, such as calcium sulfate, may be placed within the hollow spacers for the purpose of absorbing moisture from the gas within the interpane space, the slots in the spacer wall permitting some diffusion of gas across the wall.

When hollow spacers of the type described above are employed, the use of the various methods of the prior art to replace air in the interpane space with argon or other gas generally does not provide good results since air that is present within the hollow spacer interiors commonly is not fully exchanged.

Moreover, the use of vacuum systems to draw air from an interpane space and the introduction of a different gas into the interpane space causes pressural forces to be exerted on the panes and spacer which can result in pane damage or spacer failures. Even small pressure differentials across a pane, acting on the large pane surface, can give rise to substantial pneumatic forces resulting in substantial bowing of the panes.

SUMMARY OF THE INVENTION

The present invention provides a method for quickly and economically fabricating a plurality of gas-containing insulating glass assemblies without damage to panes or spacers. In its broader aspect, the invention relates to a method in which a plurality of glass assemblies are formed into a self-supporting unit, each assembly comprising at least a pair of aligned, parallel, spaced glass panes having a peripheral spacer and confronting surfaces defining with the spacer an interpane space, and having at least one exteriorly accessible peripheral opening, are positioned with their panes extending in parallel, generally vertical planes with at least one pane of each assembly supporting a pane of a neighboring assembly. The generally vertical assemblies are moved as a unit into a chamber which is then evacuated to draw substantially all of the air from the interpane spaces. A gas having a coefficient of thermal conductivity ("$K_c$") lower than that of air is then introduced into the chamber, the gas refilling and occupying the interpane spaces. During especially the evacuation step, confronting surfaces of the panes of neighboring glass assemblies provide mutual support against undue bulging or bowing of the panes. The low $K_c$ gas may be flowed into the chamber to a final pressure slightly above ambient pressure to prevent air from reentering the interpane spaces during subsequent processing. The assemblies are then removed from the chamber as a unit and the openings are closed, as with plugs, to seal the interpane spaces. The flow rates of air and gas desirably are so regulated as to prevent a pressure differential across the at least one opening in each assembly from exceeding about four pounds per square inch and preferably two pounds per square inch.

In a preferred embodiment, a conveyor is provided for conveying a unit of glass assemblies into and out of the vacuum chamber, the conveyor having a generally horizontal portion for supporting edges of the glass assemblies forming a unit and a generally vertical portion normal to the generally horizontal portion for supporting a generally vertical portion of the unit. The conveyor extends along a path through aligned front and rear door of the chamber, and incudes a first section outside the front chamber door and upon which may be provided a unit of glass assemblies, a second section within the chamber, and a third section beyond the rear door of the chamber to provide a work station for sealing the openings of the units.

Desirably, spacers are employed having hollow interiors, each spacer having a wall facing the interpane space and that has a plurality of small apertures extending substantially along its length and through which gas may flow between the interpane space and the hollow spacer interior during the evacuation and gas refilling steps. Preferably, when the evacuation step has been completed, the unit of glass assemblies is maintained at a pressure of 10 torr or less for a period of about fifteen seconds or less to insure that substantially all of the air within the hollow spacers has been removed from the assemblies.

DESCRIPTION OF THE DRAWING

FIG. 4 is a broken away, cross-sectional view showing a corner of an insulating glass assembly manufactured in accordance with the invention;

FIG. 5 is a broken away, cross-sectional view taken along Line 5—5 of FIG. 4; and FIG. 6 is a schematic representation of one means of operation of the invention.

DESCRIPTION OF THE PREFERRED EMBODIMENT

Figure 1:
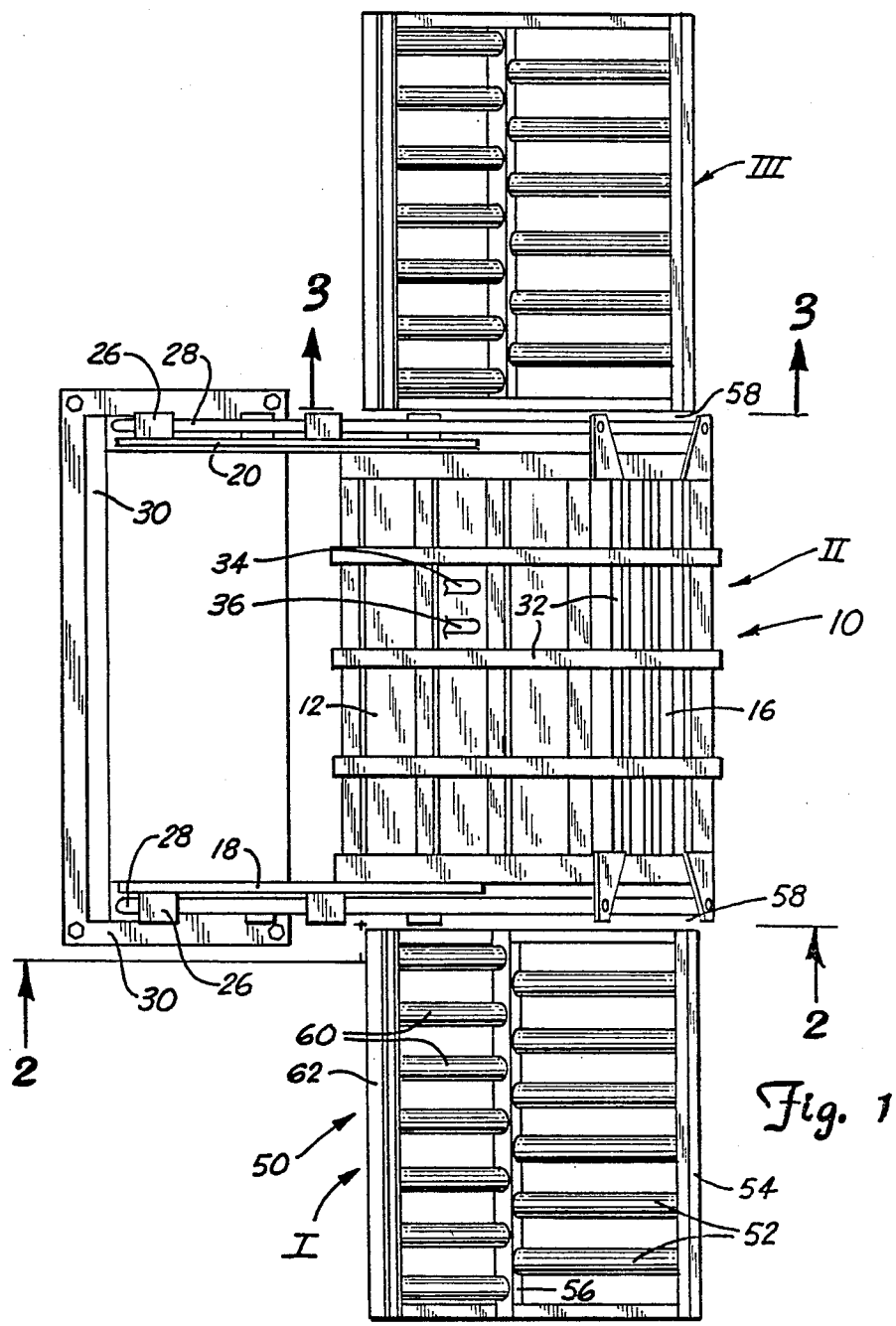
FIG. 1 is a plan view of an apparatus according to the invention.
Figure 2:
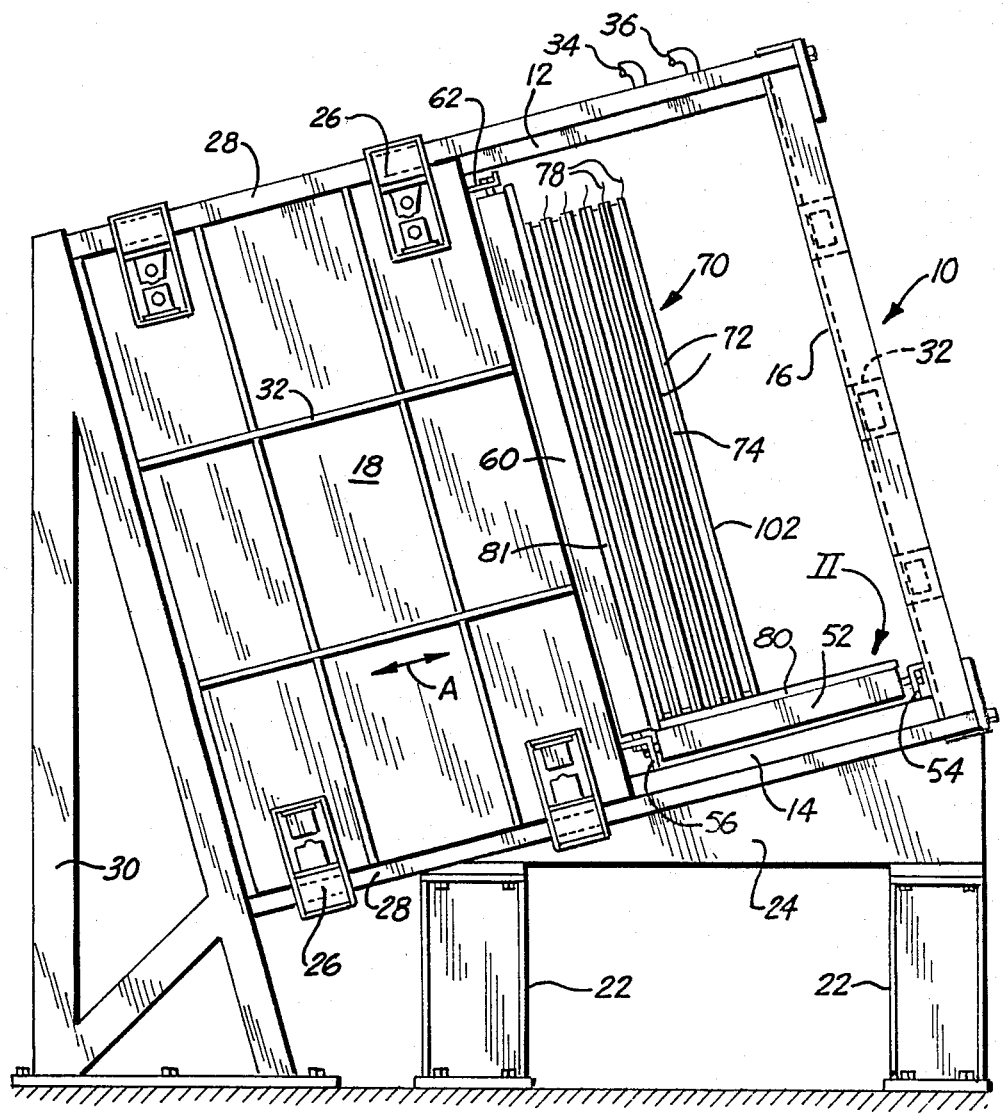
FIG. 2 is a view taken along Line 2—2 of FIG. 1.

With reference to FIGS. 1 and 2, a vacuum chamber is designated generally as 10, the vacuum chamber being generally box-shaped and having top and bottom walls 12, 14 and side walls of which one is shown at 16. The chamber 10 is provided with front and rear sliding doors 18, 20, the doors being shown in their open position in FIGS. 1 and 2. The vacuum chamber is mounted above the floor (shown at 21) by means of a supporting framework designated generally as 22, the framework including a tilted upper portion 24 (FIG. 2) supporting the chamber in a tilted position as shown best in FIG. 2. The doors 18, 20 are supported by means of mounting blocks 26 slidable along parallel rails 28 at either end of the vacuum chamber 10, the rails serving to guide the doors 18, 20 between open positions shown in FIGS. 1 and 2 and closed positions in which the doors seal the open ends of the vacuum chamber. The rails 28 each are supported at one end by the side wall 16 of the vacuum chamber and at the other end by a floor-mounted side frame designated 30 in FIGS. 1 and 2. The doors and enclosing walls of the vacuum chamber are provided with stiffening ribs depicted generally at 32. Lines 34 and 36 connect the chamber to a source of vacuum (shown schematically at 38 in FIG. 6) and to a source 40 of a low $K_c$ gas such as argon. The source of vacuum 38 may be a simple reciprocating vacuum pump, and the source of low $K_c$ gas may be a tank of the gas as is commercially available.

Figure 3:
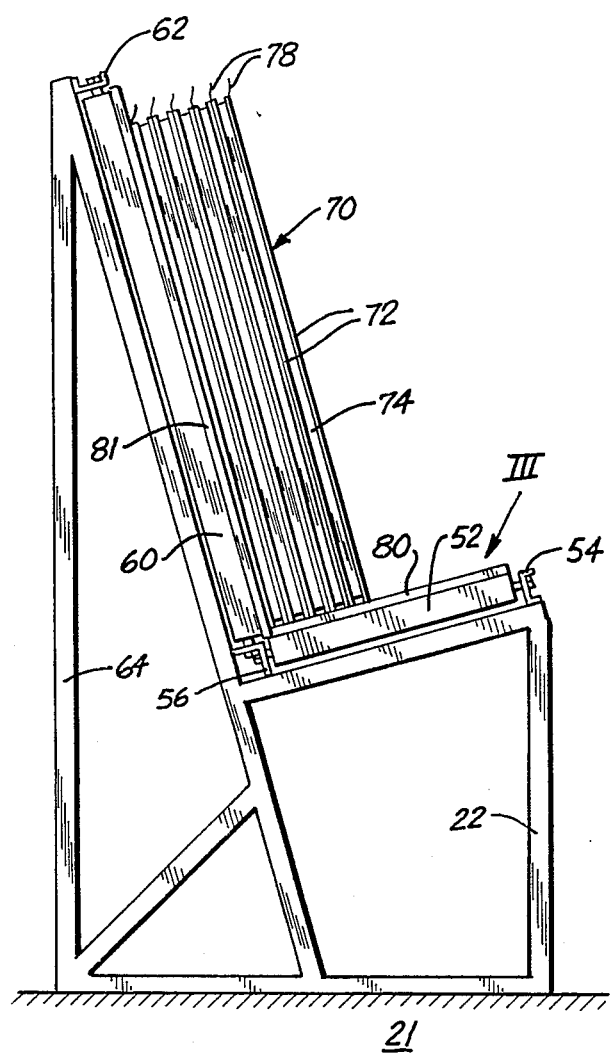
FIG. 3 is a view taken along Line 3—3 of FIG. 1.

Referring to FIGS. 1–3, a conveyor is shown generally at 50. The conveyor typified in the drawing comprises a series of generally horizontally extending rollers 52 having ends journaled into angle iron supports 54, 56, the angle iron supports having a first section extending up to the doorway of the vacuum chamber, a second section within the vacuum chamber, and a third section, shown in FIGS. 1 and 3, extending outwardly of the vacuum chamber on the other side of door 20. The three sections are aligned in a straight path. The gaps 58 (FIG. 1) in the angle iron supports between adjacent sections provide room for the doors 18, 20 to slide into their closed positions between adjacent rollers 52.

The conveyor also includes a generally vertical series of rollers, designated as 60, which are journaled between the previously identified angle iron frame 56 and upper frame 62, the rollers 60 extending generally at right angles to the rollers 52. As shown best in FIGS. 2 and 3, the rollers 52, 60 are not truly horizontal or vertical, but rather are tilted through an angle, preferably of about 15°, to provide the conveyor with a generally upwardly-open "V" configuration, each set of rollers 52, 60 forming each arm of the V. The rollers 60 extending along the third portion of the conveyor (beyond the door 20 of the vacuum chamber) are supported as shown in FIG. 3 by a ground mounted frame 64; a similar frame (not shown) is provided for the first section of conveyor extending outwardly from the door 18 of the vacuum chamber. The angle iron frames supporting the rollers within the chamber 10 are supported by the floor and walls of the chamber. As shown in FIG. 2, the inner side walls 16 of the chamber are desirably tilted to run parallel to the rollers 60.

Individual multi-pane glass assemblies are shown generally at 70 in FIG. 3, each comprising a pair of parallel glass panes 72 and a peripheral spacer 74 joined to the panes by sealing strips of a polymer such as polyisobutylene, the latter being shown at 76 in FIG. 5. Adjacent assemblies 70 may have their confronting panes in surface-to-surface contact, or, preferably, individual assemblies may be separated by flexible protective sheets 78 of paper or the like. As shown in FIGS. 2 and 3, the individual multi pane glass assemblies 70 are stacked one against another so that their individual panes 72 are parallel and extend generally in vertical planes; that is, the panes 72 extend in planes parallel to the rollers 60. The lower ends of the panes 72 may rest directly upon the rollers 52, or, preferably, may be supported instead upon a rigid sheet such as board 80, the latter rolling upon the rollers 52 and moving with the panes as they travel from Section I to Section III of the conveyor.

The spacer 74, as depicted particularly in FIGS. 4 and 5, is desirably made from aluminum or other convenient metal or plastic by extrusion or by bending or other fabrication techniques. The spacer may be of any convenient cross-sectional configuration, one such configuration being generally C-shaped with the arms of the C extending outwardly parallel to the panes and toward outer edges of the glass panes. The spacer shown in FIGS. 4 and 5, however, is particularly preferred and is generally "D" shaped in cross section, with the flat wall 90 with its central seam 91 facing the interpane space. The spacer may be provided with a series of small slots 94 (FIG. 5) extending along the length of the spacer and communicating its hollow interior with the interpane space. Granules of calcium sulfate 92 (FIG. 4) may be placed within the hollow interior of the spacer. The spacer for each glass assembly desirably is formed from a single length of extrusions, being bent at right angles at each of three corners and having its ends abutting at the fourth corner. A solid, L shaped corner key 96 (FIGS. 4 and 5) has its arms inserted within abutting ends of the spacer 74, and the corner joint thus formed is sealed as by soldering. To form an opening extending through the spacer into the interpane space, a corner portion of the spacer may be ground flat as shown at 98 in FIG. 4, and a small opening, designated 100 in FIG. 4, is drilled through the corner key 96. As thus described, the glass assemblies are stacked as shown in FIGS. 2 and 3 upon the conveyor for subsequent evacuation and refilling with gas, the openings 100 subsequently being plugged as will be described at greater length below.

The multi-pane glass assemblies, prior to evacuation and refilling with a low $K_c$ gas, may be assembled on a horizontal surface and then repositioned upon the conveyor as shown in FIGS. 2 and 3, or may be assembled directly upon Section I of the conveyor. The glass panes are suitably prepared, as by washing. A spacer 74, appropriately shaped and with its ends joined by means of the corner key 96 duly ground as shown at 98 and with opening 100, is provided with beads of an adhesive rubber on opposed surfaces and is then laid against one of the glass sheets. A second glass sheet is placed over the spacer, the adhesive rubber beads forming the polymer strips 76 (FIG. 5) and sealing each glass pane about its periphery to the spacer. As mentioned previously, the glass assemblies as thus prepared are positioned against one another as shown in FIGS. 2 and 3, interliners such as paper (78) being preferably positioned between adjacent glass assemblies, and lower edges of the glass assemblies resting upon a rigid sheet 80 or other support which rests upon rollers 52. A second flat support, shown at 81 in FIGS. 2 and 3, is positioned against the rollers 60 and has a flat, smooth plane surface against which rests the first paper interliner 78, the support 81 supporting, in surface-to-surface contact through the interlayer, the confronting surface of the first glass assembly. Although only five glass assemblies are shown in FIGS. 2 and 3, the vacuum chamber and conveyor desirably are dimensioned so as to accommodate units of 10 to 20 or more glass assemblies at one time.

Once the glass assemblies 70 have been appropriately positioned on the conveyor, the assemblies as a unit are moved along the conveyor into the vacuum chamber. The doors 18, 20 are closed and sealed, and air is evacuated from the vacuum chamber at a controlled rate. As the chamber is evacuated, air escapes from the interpane spaces in each glass assembly through the corner openings 100. Care must be taken, particularly as evacuation of the chamber is initiated, to avoid pressure differentials across the openings 100 that exceed about four pounds per sguare inch and preferably two pounds per square inch. Since the glass units may have surface areas of several square feet, the pneumatic forces generated against the panes by pressure differentials of even a few psi can be substantial. As the chamber is evacuated, the panes (particularly the outermost pane 102 in FIG. 2) tends to bow outwardly since, due to the restricted air flow through the opening 100, the pressure within the interpane space decreases more slowly than the pressure within the vacuum chamber itself.

It may be desirable in some instances to place an additional support, such as a heavy metal plate, against the exposed surface of the pane 102 (FIG. 2) to prevent that pane from unduly bowing out as air is evacuated from the vacuum chamber.

Once a suitably low pressure within the vacuum chamber has been attained (pressures of not greater than about 10 torr are desired, and pressures down to approximately 1 torr and below are preferred), the chamber desirably is maintained at such low pressure for a period of up to about fifteen seconds to permit the hollow interiors of the spacers to come into substantial pressure equilibrium with the interpane space. Thereafter, argon or another low $K_c$ gas is introduced to the vacuum chamber, again at a controlled rate to prevent the pressure differential across the opening 100 from exceeding 4 psi and preferably 2 psi. The rate of pressure decrease within the vacuum chamber during the evacuation step, and the rate of increase of gas pressure within the vacuum chamber during refilling with a low $K_c$ gas, may be appropriately controlled with a simple controller which measures pressure within the vacuum chamber and, in a simple form, compares the measured pressure with a preprogrammed pressure, providing an error signal to the vacuum pump or gas valve to regulate pressure within the vacuum chamber to a predetermined, time-dependent value. Pressure regulating controllers are well-known, and a suitable controller is shown schematically at 102 in FIG. 6. A chamber pressure signal may be supplied to the controller through Line 104 which, in turn, provides appropriate signals through leads 106, 108 to the vacuum pump and to the supply of gas 40.

The low $K_c$ gas may be supplied to the vacuum chamber to a final pressure slightly higher than the ambient atmospheric pressure such that when the glass assemblies, as a unit, emerge from the vacuum chamber, low $K_c$ gas will slowly leak from the openings 100 as pressure equilibrium between the interpane spaces and the ambient atmospheric pressure is approached. It is also desired to permit the atmospheric or slightly super atmospheric low $K_c$ gas to remain in contact with the glass assemblies within the closed vacuum chamber for a period of up to about fifteen seconds to permit the gas pressure within the hollow spacers to come into equilibrium with the interpane pressures.

It will now be understood that the individual panes of the glass assemblies, supported as they are by adjacent panes, undergo little bulging or bowing during the evacuation step, the glass assemblies supporting one another against such deflection. It is highly desirable that surface-to-surface contact between confronting surfaces of adjacent glass assemblies (either direct contact or through a spacer sheet 78), be maintained throughout the evacuation and refilling steps. As mentioned above, the glass panes tend to bow outwardly during the evacuation step. The close contact between mutually supporting glass assemblies reduces the amount of bowing of the respective glass panes. As shown in FIG. 2, the glass assemblies do not rest upon one another with their entire weight, as they would were the rollers 60 to extend horizontally. However, each glass assembly does bear to some extent the weight of an adjacent glass assembly due to the desired tilt of the series of rollers 52 and 60, thereby maintaining the glass assemblies in contact with one another.

Once the vacuum chamber has been refilled with a low $K_c$ gas as desired, the door 20 is opened and the glass assemblies 70 are removed as a unit along the conveyor onto Section III thereof. The openings 100 are then guickly plugged as by a polymeric plug, or, as shown in FIG. 4, through the use of an expanding head rivet 110 such as a "pop" rivet. For low $K_c$ gases that are heavier than air, such as argon, the glass assemblies are oriented in the vacuum chamber so that they emerge from the vacuum chamber with their openings 100 positioned at an upper corner so as to avoid any tendency of the gas to flow by gravity from the opening. If desired, the rollers or other conveyor supports can be tilted as desired so that the corner of each glass assembly bearing the opening 100 is maintained as the highest corner.

Once the openings 100 have been suitably plugged, a sealant such as vulcanizable silicone rubber may be inserted within the small spaces between the edges of the glass panes and the outer portion of the spacer 74, as shown at 112 in FIGS. 4 and 5. The rivets 110 form a substantially gas tight seal and this seal is reinforced by means of the sealant 112 which preferably completely covers the exterior portion of the rivet. The sealant 112 ay be applied while the panes are maintained in the generally vertical position shown in FIG. 3, or the panes may be swung through a suitable mechanism (not shown) into a generally horizontal configuration (after insertion of the rivets 110) to facilitate application of the sealant 112.

While a preferred embodiment of the invention has been described, it should be understood that various changes, adaptations and modifications may be made therein without departing from the spirit of the invention and the scope of the appended claims.

What is claimed is:

1. Method for fabricating multi-pane insulating glass assemblies each having a sealed interpane space and each containing a gas having a coefficient of thermal conductivity lower than that of air, comprising:
   a. providing a plurality of glass assemblies, each comprising at least a pair of aligned, parallel, spaced glass panes having confronting surfaces defining therebetween an air-containing interpane space and having a spacer carried peripherally between the panes, each assembly having at least one exteriorly accessible peripheral opening through which gas may flow into and out of the interpane space, the panes of the plurality of glass assemblies extending in parallel, generally vertical planes and at least one pane of each assembly supporting a pane of a neighboring assembly;
   b. moving the plurality of glass assemblies as a unit into a chamber;
   c. evacuating the chamber to draw substantially all of the air from the interpane spaces;
   d. flowing into the evacuated chamber a gas having a coefficient of thermal conductivity lower than that of air, the gas refilling and occupying the interpane space; the flow rates of air and gas from and into the chamber being so controlled as to prevent the pressure differential across the at least one opening of each assembly from exceeding about 4 psi;
   e. removing the glass assemblies as a unit from the chamber; and
   f. closing the at least one opening in each assembly to seal gas within the interpane space thereof.

2. The method of claim 1 wherein the at least one exteriorly accessible opening extends through the thickness of a spacer located at the top of each assembly as the assemblies are removed from the chamber as a unit.

3. The method of claim 2 wherein the glass assemblies are generally rectangular and wherein the at least one exteriorly accessible opening is positioned at an upper corner of each of the assemblies as the latter are removed from the chamber.

4. The method of claim 3 including the step of inserting a plug into each opening to seal the same against gas escape.

5. The method of claim 4 wherein the plug is an expanding head rivet.

6. The method of claim 1 including the step of flowing said gas into the chamber to a final chamber pressure slightly greater than ambient atmospheric pressure.

7. The method of claim 3 wherein the glass assemblies each include a spacer comprising a hollow channel having ends abutting at one assembly corner and having a solid corner key received within the hollow abutting ends of the spacer, said exteriorly accessible opening being formed through the corner key.

8. The method of claim 1 wherein the planes defined by the plurality of glass assemblies are maintained at an angle of about 15° to the vertical while in the chamber.

9. The method of claim 1 wherein adjacent glass assemblies have panes supporting one another throughout substantially their entire areas.

10. The method of claim 9 including the step of poviding protective sheets between confronting surfaces of neighboring glass assemblies.

11. Method for fabricating multi-pane insulating glass units each having sealed interpane spaces comprising the steps of:
   a. providing a plurality of glass assemblies each comprising a pair of aligned, spaced glass panes having therebetween a peripheral spacer, the panes having confronting surfaces defining with the spacer an air containing interpane space, each assembly having an exteriorly accessible peripheral opening adjacent a corner thereof through which gas may flow into and out of the interpane space;
   b. positioning said glass assemblies in aligned, adjacent, generally vertical planes with at least one pane of each assembly supporting a pane of an adjacent assembly in surface-to-surface contact through an intermediate protective sheet;
   c. moving the plurality of mutually supporting glass assemblies as a unit into a chamber, and evacuating the chamber to draw substantially all of the air from the interpane spaces;
   d. flowing into the evacuated chamber a gas having a coefficient of thermal conductivity lower than that of air, the gas refilling and occupying the interpane space;
   e. the rates of flow of air from the chamber and gas to the chamber being regulated so as to prevent the pressure differential across the at least one opening of each assembly from exceeding about 4 psi;
   f. removing the unit of glass assemblies from the chamber; and closing the opening in each assembly to seal therewithin the gas.

12. Method for fabricating multi-pane insulating glass assemblies each having a sealed interpane space and each containing a gas having a coefficient of thermal conductivity lower than that of air, comprising:
   a. providing a plurality of glass assemblies, each comprising at least a pair of aligned, parallel, spaced glass panes having confronting surfaces defining therebetween an air-containing interpane space and having a spacer carried peripherally between the panes, each assembly having at least one exteriorly accessible peripheral opening extending through the thickness of a spacer located at the top of each assembly and through which gas may flow into and out of the interpane space, the panes of the plurality of glass assemblies extending in parallel, generally vertical planes and at least one pane of each assembly supporting a pane of a neighboring assembly;
   b. moving the plurality of glass assemblies as a unit into a chamber;
   c. evacuating the chamber to draw substantially all of the air from the interpane spaces;
   d. flowing into the evacuated chamber a gas having a coefficient of thermal conductivity lower than that of air, the gas refilling and occupying the interpane space;
   e. removing the glass assemblies as a unit from the chamber; and
   f. while maintaining the position of the assemblies as the same are removed from the chamber as a unit so that the at least one exteriorly accessible opening extends through the thickness of a spacer located at the top of each assembly, closing the at least one opening in each assembly to seal gas within the interpane space thereof.

13. The method of claim 12 wherein the flow rates of air and gas from and into the chamber are controlled so as to prevent the pressure differential across the at least one opening of each assembly from exceeding about 4 psi.

14. Method for fabricating multipane insulating glass assemblies comprising providing a plurality of glass assemblies each comprising a pair of aligned, parallel spaced glass panes having confronting surfaces defining between then an air containing interpane space and having a spacer carried peripherally between the panes, each assembly having at least one exteriorly accessible peripheral opening, the panes of the plurality of glass assemblies extending in parallel, generally vertical planes and at least one pane of each assembly supporting a pane of a neighboring assembly; moving the plurality of glass assemblies as a unit into a chamber; evacuating the chamber to draw substantially all of the air from the interpane spaces through the at least one exteriorly accessible peripheral opening of each assembly; flowing into the evacuated chamber a gas having a coefficient of thermal conductivity lower than that of air, the gas refilling the interpane space through the exteriorly accessible peripheral opeings; removing the glass assemblies as a unit from the chamber; and closing the at least one opening in each assembly to seal gas within its interpane space.

15. The method of claim 14 including the step of leaning the glass assemblies supportively against one another, the parallel planes defined by the glass panes being angled from the vertical.

* * * * *